United States Patent [19]

Carleton

[11] 4,249,928
[45] Feb. 10, 1981

[54] GAS HEARTH BED WITH GROOVED EXIT PORTION

[75] Inventor: G. Robert Carleton, Carlisle, Pa.

[73] Assignee: PPG Industries, Inc., Pittsburgh, Pa.

[21] Appl. No.: 72,701

[22] Filed: Sep. 4, 1979

[51] Int. Cl.³ .............................................. C03B 27/00
[52] U.S. Cl. ................................... 65/182.2; 65/273; 65/25.2; 65/25.3
[58] Field of Search ...................... 65/25.2, 25.3, 25.4, 65/182 A, 273, 348

[56] References Cited

U.S. PATENT DOCUMENTS

| 1,622,817 | 3/1927 | Waldron | 65/182 A X |
| 3,223,501 | 12/1965 | Fredley et al. | 65/25 A |
| 3,338,697 | 8/1967 | McMaster et al. | 65/182 A |
| 3,923,488 | 12/1975 | Pytel et al. | 65/114 |
| 4,046,543 | 9/1977 | Shields | 65/182 A |

*Primary Examiner*—Arthur D. Kellogg
*Attorney, Agent, or Firm*—Donald Carl Lepiane; Edward I. Mates

[57] ABSTRACT

Tempered flat glass sheets produced by the gas hearth process tend to become warped and/or kinked. Grooving the surface of the gas hearth bed at its exit portion only in the vicinity of supply passages not interspersed with exhaust passages reduces the warping and kinking to a significant degree.

5 Claims, 5 Drawing Figures

GAS HEARTH BED WITH GROOVED EXIT PORTION

BACKGROUND OF THE INVENTION

1. Field of the Invention

The present invention relates to the tempering of flat glass sheets and particularly, glass sheets that are tempered while conveyed first over a gas hearth bed in the form of an apertured roof of refractory material for a hot gas plenum chamber of the type depicted in U.S. Pat. No. 3,338,697 to McMaster et al. followed immediately by conveyance through opposed blasts of chilling medium. Such gas hearth beds have gas supply passes interspersed with exhaust passages to provide a thin bed of gas to support the glass sheets during their heating that procedes rapid chilling. The arrangement of supply and exhaust passages is such to minimize any gross variation from the support pressure provided throughout the extent of the gas bed.

The present invention particularly relates to the tempering of flat glass sheets that are supported horizontally or substantially horizontally during their thermal treatment while supported successively on hot gas and cool gas. Glass sheets so treated tend to develop an upward kink or curl, particularly at their leading edge. This upward curl is noticeable even when associated with relatively small glass sheets and may be located anywhere along the length of the sheet, most frequently in its leading edge portion. However, when tempering glass sheets having one or more dimensions greater than one meter, the leading edge of the glass sheet is more likely to develop an enlarged, upward curl. In such larger glass sheets and in sheets of smaller dimension heated on a gas hearth, the leading edge curl is sometimes sufficiently severe to cause the glass sheet to depart from the flat shape desired by an amount sufficient for the glass to be outside tolerance requirements. Such severe edge curl leads to customer rejects. Leading edge curl is the deviation from flatness of the glass sheet measured in the direction of its thickness in its initial one foot (30 centimeters) of length. Sometimes, maximum curl is observed away from the leading edge. In such case, maximum curl is the term used to identify the maximum deviation from flatness along any one foot of a glass sheet dimension.

Another defect of tempered glass is known as warp. Warp is the term used to define the maximum deviation from flatness along an entire dimension of a glass sheet. In rectangular glass sheets, warp is measured along the leading, trailing and side edges.

In well-known commercial procedures for tempering glass sheets, the sheets are first heated to a temperature corresponding substantially to the softening point of the glass and then are chilled rapidly to a temperature below the annealing range of the glass to impart a temper. Conventionally, the sheet is heated while transported through an enclosed hot atmosphere of a furnace and propelled forwardly through the furnace exit into a cooling station comprising upper and lower plenums which flush the opposite surfaces of the sheet with streams of suitable tempering medium, such as air under predetermined pressure applied through arrays of nozzles which chill the glass and impart the desired stress patterns therein. Cooling air is directed against the opposite surfaces of the sheet while the sheet moves between the upper and lower plenums in order to impart the temper desired.

It is also well known to arrange the size and distribution of exhaust passages relative to the supply passages to provide a pressurized gas bed whose pressure does not vary greatly between different regions of the gas supply bed. Prior to the present invention no effect was made to provide exhaust passages in the exit portion of the gas hearth bed due to the difficulty of drilling exhaust passages through the end wall structure at the end of the gas supply bed. Consequently, the exit portion of the gas supply bed was provided with smaller diameter gas supply passages than those provided throughout the rest of the bed. Nevertheless, warp and kink developed in glass sheets tempered on apparatus employing gas hearths so constructed.

2. Description of the Prior Art

U.S. Pat. No. 3,223,501 to Fredley et al. discloses a gas support bed or hearth forming the roof of a plenum chamber where exhaust passages are interspersed among gas supply modules to insure a relatively constant gross pressure profile throughout the extent of said gas hearth. The modules of the bed are of discrete, metal construction and thermal expansion of individual modules at different rates warped the upper surface of the gas bed.

U.S. Pat. No. 3,338,697 to McMaster et al. discloses a slightly different arrangement of supply passages and exhaust passages in a gas hearth composed of a low expansion refractory material such as quartz. The low expansion quartz has less tendency to warp than the metal module bed of the Fredley et al patent. However, quartz is brittle so that it is not advisable to fabricate separate modules of quartz with spaces between the separate modules as is possible with metal modules. Furthermore, at the downstream end of the gas hearth, it is virtually impossible to fabricate exhaust holes through the downstream end portion of the plenum chamber roof that forms the gas hearth bed and through the end wall that supports the downstream end of the roof, particularly in a gas hearth bed that is already in existence.

U.S. Pat. No. 3,923,488 to Pytel et al. discloses a technique for reducing upward curl at the leading edge of a glass sheet conveyed through a heated area and a cooling area by applying a cooling medium toward a portion of the lower surface of the glass sheet only in spaced relation to its leading edge. This application is started after the glass sheet leaves the furnace and before the glass portion reaches a position where both its upper and lower surfaces are cooled by exposure to opposing blasts of tempering medium. The entire length of glass sheet except for the leading one foot or so of length is subjected to this differential cooling treatment.

It would be desirable to develop a different method for controlling warping, kinking or curling that does not depend on controlling the timing of means to apply tempering medium differentially to selective portions of glass sheets.

SUMMARY OF THE INVENTION

The present invention provides a relatively simple technique for reducing the warp and kink or curl in a glass sheet that is tempered while conveyed along a substantially horizontal path through a heating area and a cooling area. According to the present invention, the upper surface only of the exit portion of the gas hearth bed that has no interior exhaust passages is provided with a plurality of elongated grooves extending parallel to and equidistant from adjacent rows of supply passages. The grooves gradually increase in depth toward the exit end of the gas hearth bed to compensate for the reduced effect of exhausting excess support gas at increasing downstream distance from the interior exhaust passages and begin downstream of the conventional exhaust passages and terminate at the downstream end of the gas hearth bed. The grooves are not deep enough to weaken the ceramic gas hearth bed, yet provide short exhaust passages along the surface of the bed in directions different from the directions of the interior exhaust passages conventional in prior art gas hearth beds.

The elongated grooves provide paths of escape for excess support gas toward the downstream end of the gas hearth bed where the grooves communicate with a space between the gas hearth bed and the upstream end of the cooling station between which the support gas can escape. The grooves provide relatively short passages of gradually increasing depth with increasing distance from the interior exhaust passages for the escape of said support gas toward the downstream end of the gas hearth bed in the region where the exhaust passages have decreasing effect on gas removal. The grooves moderate the upward force of the support gas on the hot glass sheet and reduce the tendency of the sheet to develop kink and warp as a consequence of its tempering while supported on a gas bed, first on hot gas, then on chilling gas.

BRIEF DESCRIPTION OF THE DRAWINGS

In the drawings which form part of a description of a preferred embodiment of the present invention and wherein like reference numbers refer to like structural elements.

DESCRIPTION OF A PREFERRED EMBODIMENT

Figure 2:
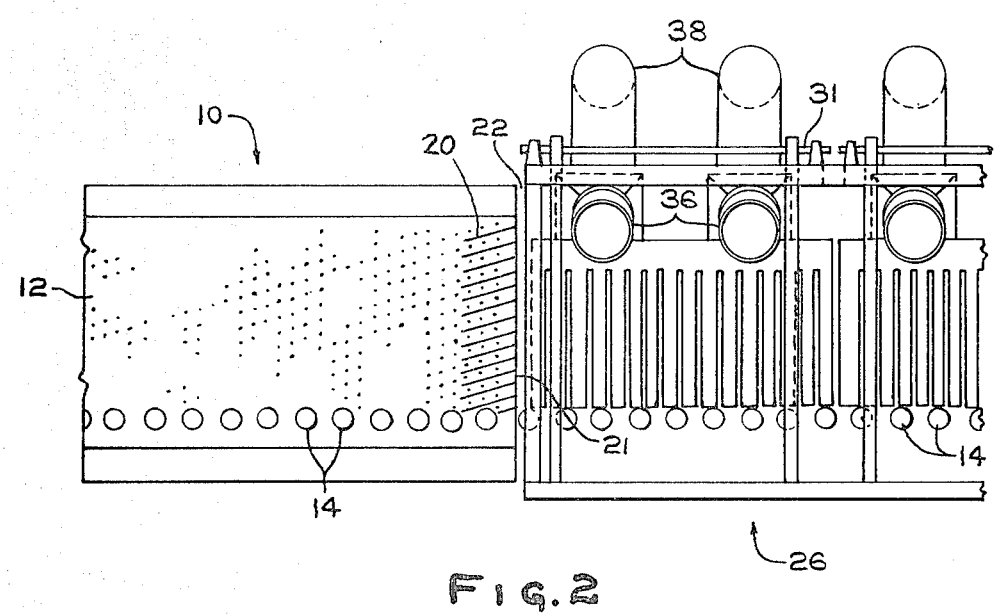
FIG. 2 is a horizontal section taken along the line 2—2 of FIG. 1 showing the grooves in plan.
Figure 1:
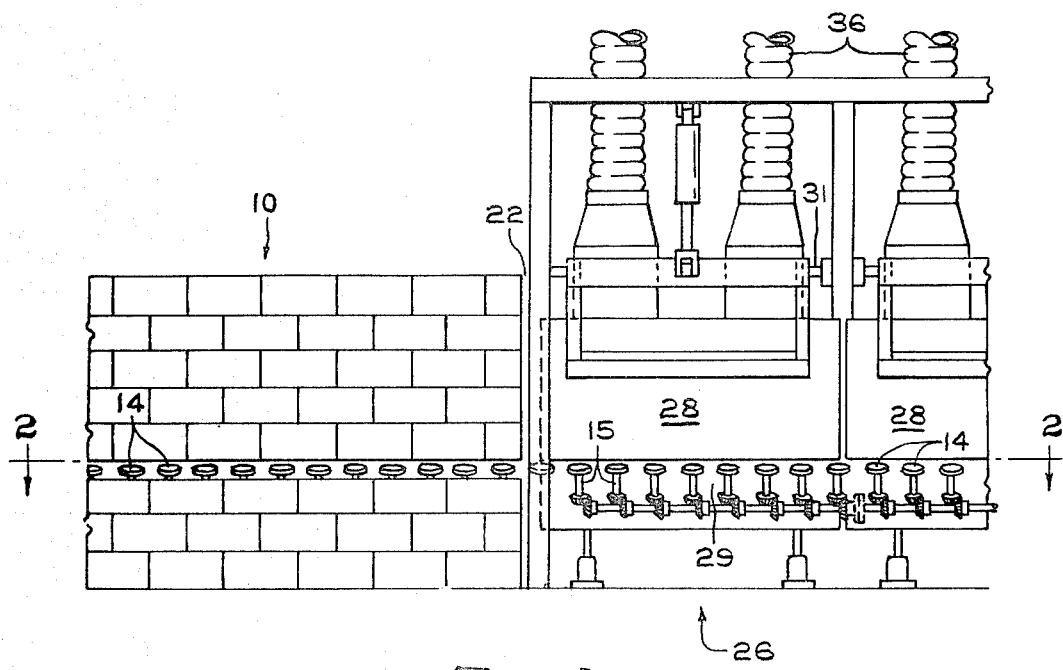
FIG. 1 is a fragmentary, longitudinal, side view of apparatus comprising a gas hearth bed modified with exhaust grooves at an exit portion of a furnace according to the teachings of a preferred embodiment of this invention, and including a showing of an entrance portion of a cooling area adjacent the modified portion of said gas hearth bed.
Figure 3:
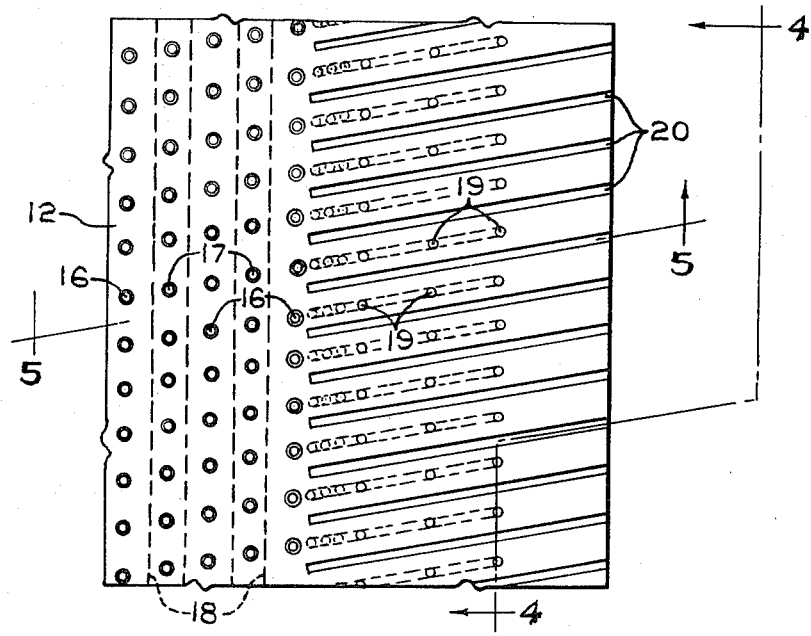
FIG. 3 is an enlarged plan view of an exit portion of a gas hearth bed showing the location of the elongated grooves relative to small diameter gas supply passages at the downstream end portion of the gas hearth bed.
Figure 4:
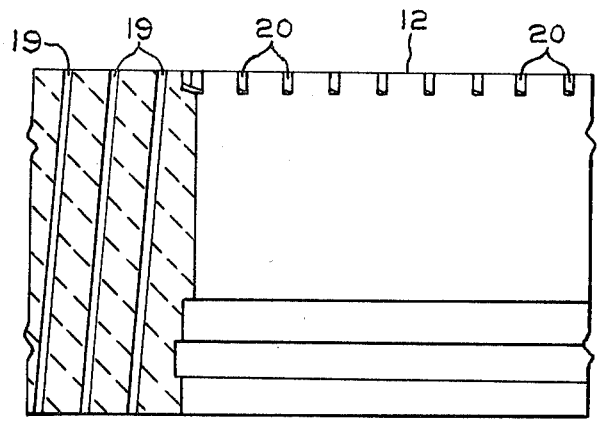
FIG. 4 is a sectional view taken along the line 4—4 of FIG. 3, showing the end of the gas hearth showing the slots and with parts removed to show certain additional supply passages at the downstream end portion of the gas hearth block.
Figure 5:
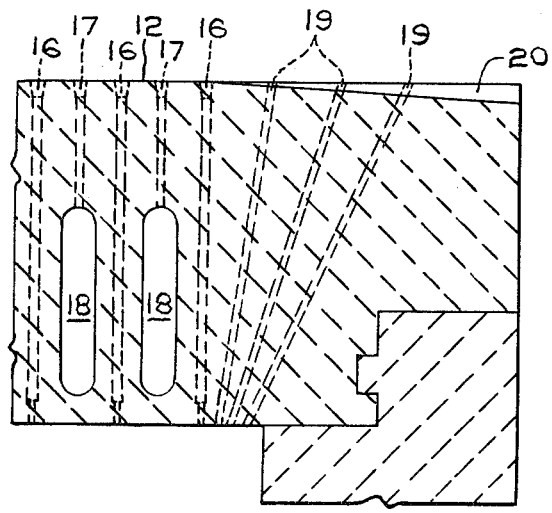
FIG. 5 is an enlarged sectional view taken along line 5—5 of FIG. 3, showing how additional small diameter supply passages are provided to supply support gas that is exhausted through adjacent surface grooves according to the present invention.

Referring to the drawings, an illustrative embodiment of apparatus incorporating features of the invention comprises a gas hearth type furnace 10. The furnace includes a gas support bed 12 comprising an apertured roof of a plenum chamber (not shown) into which hot gas is supplied under pressure for application toward the supported glass sheet surface through a series of supply passages to be described later.

In such a gas hearth furnace, glass sheets are introduced into a support area at a temperature below that at which the major surfaces will mar on physical contact with solid objects. The glass sheets are heated in turn above the deformation temperature while being supported primarily by gas supplied through apertures in the gas support bed 12 and the glass sheets are cooled after they leave the furnace to a temperature below deformation temperature before they are removed from the gas support. When glass sheets are so treated, the heating is usually supplied by hot gas through the gas support beds supplemented by radiant heat supplied by heaters within the furnace 10. The latter are usually electrical heaters although gas heaters may also be employed for supplemental heat. After the glass sheets are heated to a temperature sufficient for tempering, they usually cool sufficiently rapidly to temper and, hence strengthen the sheets. The gas hearth furnace 10 will be referred to as a heating area and the area where the glass is cooled to impart at least a partial temper will be referred to as a cooling area.

According to a typical gas hearth operation, the gas support bed 12 is supported on vertically supported jacks (not shown) which support the bed 12 so that its upper surface extends transversely to its length at a slight oblique angle to the horizontal, preferably less than 15° and usually approximately 5°. In the illustrative embodiment, the glass sheets, while supported on a gaseous support of the gas support bed 12 in such a tilted relation to the horizontal have their lower edges driven by frictional contact with a plurality of rotating driving discs 14 of uniform diameter. Each of the latter is mounted on a different drive shaft 15. The latter are aligned along a line parallel to the longitudinal dimension of the gas bed 12 so that the driving discs 14 have a common inner tangential line extending parallel to the direction of movement of the glass sheets and thereby define a path of movement for the sheets. Other glass edge engaging elements may be substituted to engage the side edges and/or end edges for conveying glass sheets as they float on the gas support bed.

The gas bed 12 is provided with alternate transverse rows of interior supply passages 16 that extend throughout the thickness of the plenum chamber roof (usually 6 inches-15 centimeters) that comprises the gas support bed 12 to communicate between the plenum chamber whose roof comprises the bed 12 and the upper surface of the bed. Between each adjacent transverse row of interior supply passages 16 are alternate rows of interior exhaust passages 17. Each of the latter extends from the upper surface of the gas bed 12 and communicates with one or another of several, parallel, interior transverse passages 18 at the lower ends of the interior exhaust passages 17.

Passages 16 and 17 have upper openings that form alternate transverse rows of openings for passages 16 and 17, respectively, whereas the openings for alternate interior supply passages 16 and interior exhaust passages 17 form rows of openings that extend obliquely of the length of the gas bed 12 in near normal relation to the transverse rows. About 10 degrees obliquity from normal is a conventional orientation for the oblique rows. Hot gas under pressure is supplied to the upper surface of the bed 12 through the interior supply passages 16 and exhausted via an exhaust system comprising the interior exhaust passages 17 and the interior transverse passages 18 to the opposite lateral sides of the gas bed 12. A balanced gas pressure for supporting glass sheets on hot gas results.

At the downstream end of the gas bed 12, its end wall portion is notched to receive a mating wall member 5 (shown in section). Approximately the last 6 inches (15 centimeters) of length of the gas hearth is difficult, if not impossible, to fabricate with apertures to provide passages equivalent to the interior supply passages 16 and interior exhaust passages 17 and interior transverse passages 18, particularly after the gas hearth bed is installed. Since hot glass sheets tend to droop and rub against the end portion of the gas bed 12 in the last 6 inches of length, a plurality of auxiliary interior oblique supply passages 19 of relatively small diameter are fabricated to have small diameter openings in alignment with and forming extensions of the olique rows of openings of alternate passages 16 and 17. Unfortunately, warp and kink develop in glass sheets processed on a gas bed so constructed.

According to the present invention, elongated grooves 20 are provided in the downstream portion of the gas hearth bed beyond the region occupied by the openings for the exhaust passages 17. The grooves extend approximately midway between adjacent rows of the openings for the auxiliary oblique supply passages 19. The grooves 20 are parallel to the rows of openings for passsages 19 and extend approximately equidistant between adjacent rows of said openings in the downstream portion only of the gas bed. The grooves 20 have slight depth in the vicinity of their upstream end and gradually increase in depth toward the end wall 21 of the gas bed. The gradual increase in depth compensates for the lack of exhaust facilities at increasing distance in a downstream direction from the portion of the gas bed provided with the openings for the interior exhaust passages 17. A space 22 is provided beyond the end wall 21 of the gas bed 12 for escape of gas exhausted through the grooves 20.

In a typical modified gas hearth bed, transverse rows of supply passages alternating with transverse rows of exhaust passages were provided with openings at the upper surface of the gas hearth bed at $\frac{3}{4}$ inch (1.9 centimeters) spaces center to center of each row and between rows. The last transverse row of supply openings was $5\frac{3}{4}$ inches (14.6 centimeters) from the end wall. The passages in adjacent rows were offset from one another to provide oblique rows of openings alternating between supply passages and exhaust passages at an angle of 10 degrees to the path of glass sheet movement over the bed. Three additional narrow diameter supply passages were provided obliquely through the gas hearth bed thickness at increasing obliquity in the direction of the oblique rows to form openings spaced at a distance of $1\frac{1}{4}$ inch center to center along extensions of the oblique rows at the upper surface of the gas hearth bed 12.

The modification according to the present invention comprised grooves $5\frac{3}{8}$ inches (13.7 centimeters) long about 1/16 inch (0.16 centimeter) wide extending parallel to and equidistant from the extensions of the oblique rows provided by the narrow diameter obliquely extending supply passages. The grooves gradually increased in depth toward the donwstream end of the bed at a slope of approximately 4 degrees to provide a depth of $\frac{3}{8}$ inch (0.95 centimeters) at the downstream end of the bed. The upstream ends of the grooves were located $\frac{3}{8}$ inch (0.95 centimeters) from the center of the transverse row of openings for the downstream supply passages 16.

Beyond the gas hearth type furnace or heating area 10 and spaced about 2 inches (5 cm) from the end wall 21 of the gas bed 12 is a cooling area 26. At one side of the cooling area are located additional rotating driving discs 14 aligned with the driving discs that propel the glass sheets through the gas hearth type furnace 10. In the cooling area there are longitudinally spaced upper plenum chambers 28 directly opposing a corresponding series of lower plenum chambers 29. The latter are arranged in alignment with the bed 12 to form a continuation thereof at the same orientation of the bed. The upper and lower plenum chambers 28 and 29 direct air into a series of nozzles or modules arranged from the entrance to the exit of the cooling area 26 in a manner such as that depicted in U.S. Pat. No. 4,046,543 to Shields, the description of which is incorporated by reference.

Each of the upper plenum chambers 28 is supplied with air under pressure through flexible upper supply conduits 36 and each of the lower plenum chambers 29 is supplied with air under pressure through lower supply conduits 38. The various flexible supply conduits are connected to conventional blower means (not shown) which supply air under pressure in a manner well known in the art. The blowing means is located in the basement of a building which supports the gas hearth furnace and cooling area.

The space between the end wall 21 of the gas bed 12 and the entrance to the cooling area 26 cooperates with the grooves 20 to perform a function similar to that provided by the interior exhaust passages 17 and the interior transverse passages 18 in the main body of the gas bed 12. In addition, it has been discovered by comparing production records that glass sheets tempered on a gas hearth modified by grooves at its downstream end have less curl, kink and/or warp than glass sheets tempered on the same production apparatus prior to the addition of the grooves.

To provide data for production records, specimens are taken from production runs on a periodic basis and the measurements for each type of glass composition handled are averaged and reported monthly. Since most of the production tested involved clear and tinted float glass, and coated glass compositions did not provide a significantly large number of test samples, only the results for which there is sufficient information to be statistically significant are reported.

Bow or warp was measured by standing the glass upward and hanging a fish line freely along a major surface of the glass sheet and measuring the maximum horizontal distance between the surface of the glass sheet and the free hanging fish line along each of the four sides of the sheet, the leading edge, the trailing edge, the disc driven side edge and the opposite side edge from the driven side edge. Bow or warp was measured relative to the entire length of the glass.

Kink was measured by laying a 12 inch straight edge lightly parallel to the major surface of the vertically supported sheet and moving the straight edge over the sheet until the gap between the straight edge and glass sheet was a maximum. A tapered wedge graduated in one mil graduations was inserted between the straight edge and the major surface of the glass sheet to measure the maximum separation between the straight edge and the major glass sheet surface in the area of maximum deviation. Most often, but not always, the maximum kink reported was in the vicinity of the leading edge of the sheet.

At the time this patent application was under preparation, the grooved gas hearth bed had been in production for several months. This was sufficient time to compare the average bow and average maximum kink (most of which was due to leading edge kink) contained in the data compiled by the Quality Control Department. Data on bow and maximum kink for clear float glass production of 3 mm thick tempered glass articles based on measurements made on random production specimens for the last 8 months before the gas hearth bed was modified by grooving the exit portion was compared with production results of articles of the same thickness reported for the first six months of 1979 after the gas hearth bed was modified by grooving as described previously. Both bow and maximum kink were reduced significantly. While the Quality Control Department records for kink was based on maximum kink in any foot of tempered glass sheet dimension, most of the kink readings recorded were obtained in the leading edge portion of the production specimens tested. In the tables that follow, the numbers for bow and kink are reported in mils (thousandths of an inch). Average bow measurements across the width of the tempered glass sheet specimens were taken at the leading edge and trailing edge, while average bow measurements along the length of the tempered glass sheet specimens were taken along the driven side edge and along the opposite side edge.

TABLE I

COMPARISON OF BOW AND KINK OF TEMPERED CLEAR FLOAT GLASS SHEETS PRODUCED ON GAS HEARTH PRODUCTION LINE AS REPORTED BY QUALITY CONTROL

|  | Treated on Unmodified Line Before Grooving | Treated on Modified Line After Grooving | Percentage Improvement |
| --- | --- | --- | --- |
| Specimens measured for bow | 1289 | 1085 | — |
| Average bow at leading edge (mils) | 23.6 | 15.5 | 35% |
| Average bow at trailing edge (mils) | 26.4 | 15.3 | 42% |
| Average bow on driven side (mils) | 27.1 | 25.3 | 6% |
| Average bow on opposite side (mils) | 26.4 | 23.3 | 11% |
| Specimens measured for maximum kink | 1285 | 1070 | — |
| Average maximum kink (mils) | 15.6 | 11.5 | 26% |

TABLE II

SIMILAR COMPARISON OF BOW AND KINK OF TINTED FLOAT GLASS SHEETS (IDENTIFIED AS SOLEX ® GLASS)

|  | Before Grooving | After Grooving | Percentage Improvement |
| --- | --- | --- | --- |
| Specimens measured for bow | 19 | 9 | — |
| Average bow at leading edge (mils) | 22.9 | 11.9 | 48% |
| Average bow at trailing edge (mils) | 20.6 | 10.3 | 50% |
| Average bow at driven side (mils) | 20.5 | 11.0 | 47% |
| Average bow at opposite side (mils) | 20.3 | 9.8 | 52% |
| Specimens measured for maximum kink | 19 | 9 | — |
| Average maximum kink (mils) | 7.6 | 4.4 | 42% |

While production changes in operating parameters of a production line are made during the course of a production run as problems arise, these changes were made both on the unmodified apparatus and on the apparatus after it was modified according to the present invention. The common factor in the measurements taken is that all production measurements made prior to the modification of applying grooves could be distinguished from all production measurements made after the modification. The improvement reported in reduction of warp and maximum kink after the modification is dramatic.

The form of the invention shown and described in this specification represents an illustrative preferred embodiment and certain modifications thereof. It is understood that the specific dimensions recited are by way of illustration only and that various changes may be made without departing from the gist of the invention as defined by the claimed subject matter which follows.

I claim:

1. In a gas hearth bed for heat-treating glass sheets comprising a plenum chamber having an apertured roof provided with interior supply passages having openings through said roof for supplying gas under pressure from said plenum chamber to the upper surface of said roof to heat a glass sheet supported in closely spaced relation thereover and a plurality of interior exhaust passages having openings interspersed among said openings for said supply passages for removing sufficient gas to control the pressure of the gas that supports said glass sheet throughout the extent of said bed except for its downstream end portion, said roof including additional smaller diameter interior supply passages in the downstream end portion of said gas hearth bed, and means for conveying a glass sheet supported by said pressurized gas along a given path over the length of said bed, the improvement comprising a plurality of elongated grooves in the surface of said bed in the downstream end portion of said bed, said grooves having a gradually increasing depth an increasing distance away from the location of said openings of said interior exhaust passages.

2. The improvement as in claim 1, wherein said smaller diameter supply passages have openings in the upper surface of said roof arranged in obliquely extending, parallel rows and said grooves extend parallel to said obliquely extending rows of openings of said smaller diameter supply passages.

3. The improvement as in claim 2, wherein said grooves extend in equidistant relation between adjacent rows of said openings of said smaller diameter supply passages.

4. The improvement as in claim 2, wherein said interior supply passages and interior exhaust passages have openings in the upper surface of said bed that define transversely extending rows of openings and obliquely extending rows of openings throughout the extent of said roof except for said downstream portion of said bed, and said additional smaller diameter passages have openings in said upper surface downstream of said openings for said first named interior supply passages and said first named interior exhaust passages in alignment with said obliquely extending rows.

5. The improvement as in claim 4, wherein the upstream ends of said grooves are located downstream of said transversely extending rows of openings for said first named interior supply passages and said first named interior exhaust passages.

* * * * *